US011620920B2

(12) United States Patent
Hannaford et al.

(10) Patent No.: US 11,620,920 B2
(45) Date of Patent: Apr. 4, 2023

(54) SURGICAL TRAINING SYSTEMS AND METHODS (71) Applicant: Verily Life Sciences LLC, South San Francisco, CA (US)

(72) Inventors: Blake Hannaford, Seattle, WA (US); Joëlle Barral, Mountain View, CA (US); Daniele Piponi, Oakland, CA (US); Gianni Campion, Santa Clara, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 0 days.

(21) Appl. No.: 17/682,468

(22) Filed: Feb. 28, 2022

(65) Prior Publication Data
US 2022/0293013 A1 Sep. 15, 2022

Related U.S. Application Data (63) Continuation of application No. 15/488,249, filed on Apr. 14, 2017, now Pat. No. 11,315,438.

(60) Provisional application No. 62/354,153, filed on Jun. 24, 2016.

(51) Int. Cl.
G09B 23/28 (2006.01)
G09B 9/00 (2006.01)

(52) U.S. Cl.
CPC ............... *G09B 23/28* (2013.01); *G09B 9/00* (2013.01)

(58) Field of Classification Search
CPC ................................................ G09B 23/28
USPC ....................................... 434/262
See application file for complete search history.

(56) References Cited

U.S. PATENT DOCUMENTS

| 5,791,907 | A | 8/1998 | Ramshaw et al. |
| 7,121,832 | B2 | 10/2006 | Hsieh et al. |
| 8,662,900 | B2 | 3/2014 | Bell, III et al. |
| 9,283,675 | B2* | 3/2016 | Hager ............... A61B 34/37 |
| 2005/0084833 | A1 | 4/2005 | Lacey et al. |
| 2005/0117118 | A1* | 6/2005 | Miller ............... A61B 3/13 606/4 |
| 2006/0178559 | A1* | 8/2006 | Kumar ............... G16H 40/63 600/109 |

(Continued)

OTHER PUBLICATIONS

LAPVR Interventional Simulator by CAE Healthcare, retrieved from Internet: <https://vimeo.com/52960812>, Vimeo, Inc. 2018, 3 pages.

(Continued)

*Primary Examiner* — Kesha Frisby
(74) *Attorney, Agent, or Firm* — Christensen O'Connor Johnson Kindness PLLC (57) ABSTRACT

Systems and methods for surgical training are provided. The system may include an operating display console for a first surgeon to view a video feed of a surgery while the first surgeon performs the surgery. The system may also include a training display console for a second surgeon to view the video feed of the surgery while the surgery is performed. The system may further include a controller that interfaces with the operating display console and the training display console. The training display console may include a training interface for pausing the video feed displayed on the training display console, and for switching from a display mode to a simulation mode for simulating one or more surgical steps of the surgery.

20 Claims, 6 Drawing Sheets

(56) References Cited

U.S. PATENT DOCUMENTS

| | | | |
|---|---|---|---|
| 2009/0311655 A1 | 12/2009 | Karkanias et al. | |
| 2014/0135985 A1* | 5/2014 | Coste-Maniere | A61B 34/30 700/255 |
| 2014/0343913 A1 | 11/2014 | Avisar | |

OTHER PUBLICATIONS

CAE LapVR, "Immersive, Risk-Free Laparoscopic Training Environment", retrieved from Internet: <https://caehealthcare.com/surgical-simulation/lapvr/>, CAE Healthcare, 2018, 6 pages.

"Suturing a Horizontal Incision with Mimic's de-Trainer, Robotic Surgery Skills Simulator", retrieved from Internet: <https://www.youtube.com/watch?v=qTsX1jOs3jl>, published Oct. 25, 2013, 4 pages.

DV-Trainer—Momoe Simulator, "Proven, Cost-Effective Training for the da Vinci Surgical System", retrieved from Internet: <https://mimicsimulation.com/dv-trainer/> 2018, 5 pages.

"LapSim Appendectomy: Loop Technique", retrieved from Internet: <https://www.youtube.com/watch?v=Rx5tsd4UdHI>, 2018, 4 pages.

"LAPSIM—The Proven Training System", retrieved from Internet: <https://surgicalscience.com/systems/lapsim/>, surgicalscience, 2018, 8 pages.

3D Systems, "Urology Robotic Surgery Module—Radical Prostatectomy", retrieved from Internet: <https://simbionix.com/robotix-prostatectomy/>, Simionix, 2017, 2 pages.

"Soft Tissue Surgical Practice Models by 3D and Tulane University School of Medicine", retrieved from Internet: <https://www.youtube.com/watch?v=NDDRxivHoYw&feature=youtu.be>. May 14, 2015, 4 pages.

"Augmented Reality by Hapitca: demo", retrieved from Internet: <https://www.youtube.com/watch?v=wcIEZzVyIZU>, Sep. 2, 2009, 4 pages.

"About ProMIS Surgical Simulator", retrieved from Internet: <https://www.slideshare.net/Haptica/about-promis-surgical-simulator>, 2018, 9 pages.

* cited by examiner

SURGICAL TRAINING SYSTEMS AND METHODS

CROSS REFERENCE TO RELATED APPLICATION

This application is a continuation of U.S. application Ser. No. 15/488,249 filed on Apr. 14, 2017, which claims the benefit of U.S. Provisional Application No. 62/354,153 filed on Jun. 24, 2016, all of which contents are incorporated herein by reference.

TECHNICAL FIELD

The present disclosure relates generally to the field of surgical systems, and more particularly, system and methods for surgical simulation training during surgeries aimed at intraoperative training and rehearsal.

BACKGROUND INFORMATION

Surgical training for doctors is a complex and lengthy process. Currently, surgeons must spend years in training as a surgical resident or fellow because the learning curve is so long. Typically, an apprentice surgeon only masters a surgical procedure after having done it tens or hundreds of times, and the surgical outcome can be less than optimal for the surgeries performed by an apprentice surgeon. To flatten the learning curve, different training methods have been developed and tried. For example, simulators have been developed for surgery including some specifically developed for surgical robotics. However, simulators are typically only used for a limited number of hours at the beginning of a surgeon's training and are not used much, if at all, after an apprentice surgeon begins operating on patients. Another training method for apprentice surgeons that has been utilized is observing live surgeries performed by experienced surgeons. Alternatively, experienced surgeons sometimes proctor an apprentice surgeon during a surgery. In surgical robotics, sometimes dual consoles are available which enable the surgeon to look at one console during a procedure while an apprentice surgeon may look at the other console to observe the surgery. Although these methods of surgical training have been used for years and in some cases decades, there is much room for significant advancement in training methods and corresponding technology in order to improve the effectiveness and versatility of the training and reduce the learning curve.

SUMMARY

The present disclosure is directed to systems and methods for surgical simulation training and rehearsal.

In one aspect, the present disclosure is directed to a surgical training system. The system may include an operating display console for a first surgeon to view a video feed of a surgery while the first surgeon performs the surgery. The system may also include a training display console for a second surgeon to view the video feed of the surgery while the surgery is performed. The system may further include a controller that interfaces with the operating display console and the training display console. The training display console may include a training interface for pausing the video feed displayed on the training display console, and for switching from a display mode to a simulation mode for simulating one or more surgical steps of the surgery.

In another aspect, the present disclosure is directed to a surgical training system. The system may include a controller that interfaces with an operating display console and a training display console. The operating display console may be for a first surgeon to view a video feed of a surgery while the first surgeon performs the surgery. The training display console may be for a second surgeon to view the video feed of the surgery while the surgery is performed. The controller may display a training interface on the training display console for pausing the video feed of the surgery, and for switching the training display console to a simulation mode for simulating one or more steps of the surgery.

In another aspect, the present disclosure is directed to a method of surgical training. The method may include during a surgery displaying a video feed of the surgery on an operating display console for a first surgeon to view while performing the surgery. The method may also include during the surgery displaying the video feed of the surgery on a training display console for a second surgeon to view. The method may further include pausing the video feed of the surgery on the training display console using a training interface. The method may also include switching the training display console from a display mode to a simulation mode using the training interface. The method may further include simulating one or more surgical steps of the surgery while in simulation mode using the training interface.

DETAILED DESCRIPTION

Figure 1:
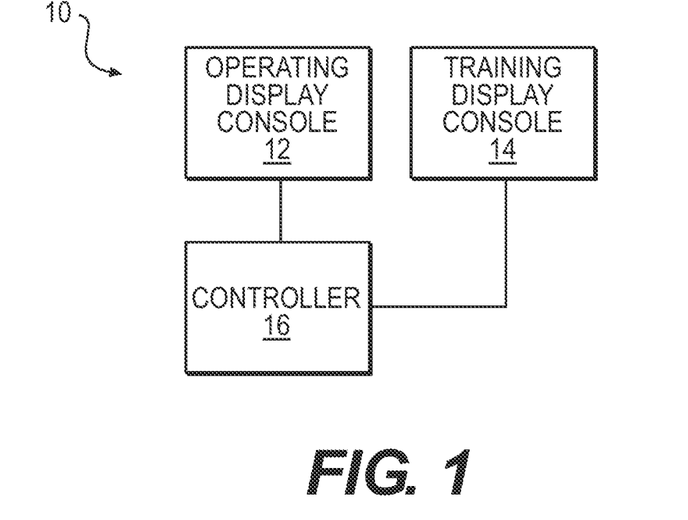
FIG. 1 is a schematic of a surgical training system, according to an exemplary embodiment.
Figure 2:
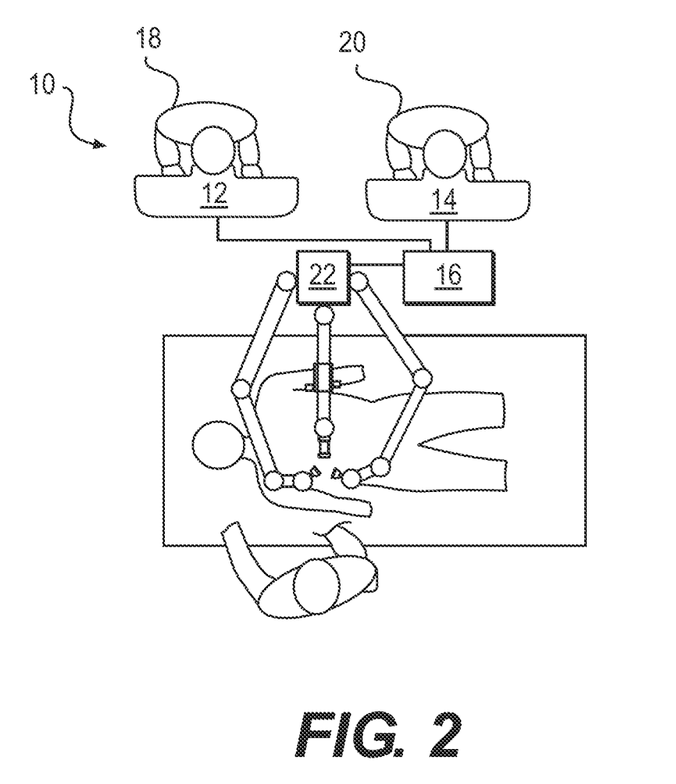
FIG. 2 is a schematic illustration of a surgical training system that interfaces with a surgical robotic device, according to an exemplary embodiment.

FIG. 1 is a schematic of a surgical training system 10, according to an exemplary embodiment. System 10 may be designed to provide surgical simulation training during a surgery. System 10 may include an operating display console 12, a training display console 14, and a controller 16 that interfaces with operating display console 12 and training display console 14. As shown in FIG. 2, operating display console 12 may be utilized by a first surgeon 18 to view a video feed of the surgery (e.g., the surgical field) while first surgeon 18 performs the surgery. Training display console 14 may be utilized to view the video feed of the surgery by a second surgeon 20 while the surgery is being performed by first surgeon 18. In some embodiments, system 10 is designed to be used for training where first surgeon 18 may be an experienced surgeon and second surgeon 20 may be a less experienced surgeon or a surgeon in training (e.g., a surgical resident or fellow). In some embodiments, system 10 may be used for training where both first surgeon 18 and second surgeon 20 may be experienced surgeons and one of the surgeons may be learning a new technique or sharpening skills.

System 10 may be used for any type of surgery, for example, general surgery, thoracic surgery, colon and rectal surgery, obstetrics and gynecology surgery, gynecologic oncology surgery, neurological surgery, ophthalmic surgery, oral and maxillofacial surgery, orthopedic surgery, hand surgery, pediatric orthopedic surgery, spine surgery, foot and ankle orthopedic surgery, brain surgery, and the like. Although system 10 is primarily described herein for use as a surgical training system, it is contemplated that system 10 may be used as a training system for all types of medical procedures and/or surgeries including diagnostic, non-invasive, minimally invasive, and open.

As shown in FIG. 2, in some embodiments, system 10 may be integrated with or configured for use with a robotic surgical device 22. In some embodiments, system 10 may also be used for surgeries where no robotic surgical device(s) is used (e.g., a traditional surgery where the surgeon holds the medical instruments.

Figure 3:
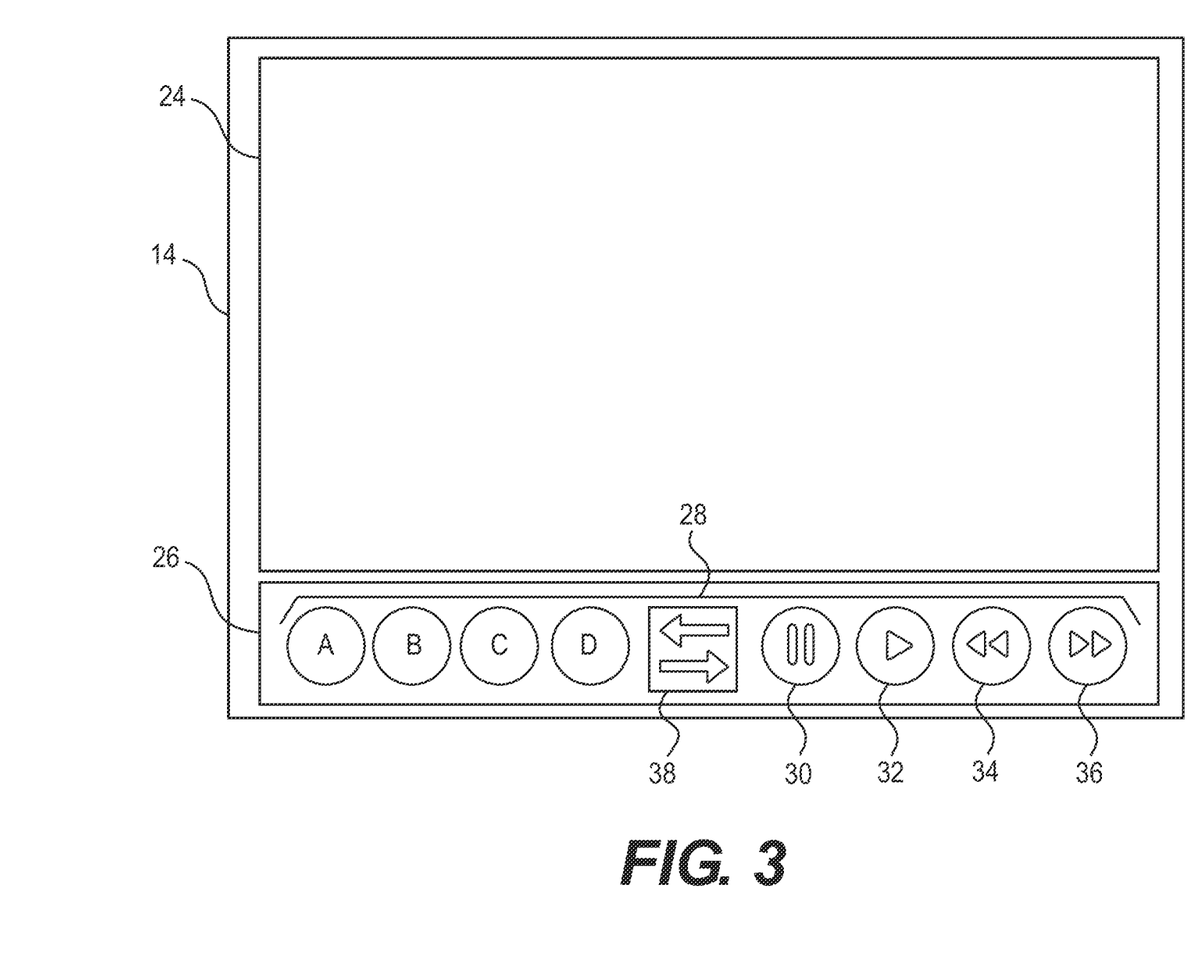
FIG. 3 is an illustration of a training display console, according to an exemplary embodiment.

As shown in FIG. 3, training display console 14 may include a screen 24 that is designed to display the video feed of the surgery while the surgery is being performed. Training display console 14 may also include a training interface 26 designed to enable second surgeon 20 to control operation of training display console 14. Although training interface 26 in FIG. 3 is shown as a plurality of buttons, it may take a variety of forms. For example, in some embodiments, training interface 26 may be configured to be a graphical user interface, a joystick, a keyboard and/or mouse, an auditory input device, or the like. In some embodiments, screen 24 may be a touch screen display and training interface 26 may be displayed as a portion of the screen. As shown in FIG. 3, in some embodiments training interface 26 may include one or more input buttons 28. Input buttons 28 may include, for example, a pause button 30, a play button 32, a rewind button 34, a fast-forward button 36, a mode switching button 38, one or more selection buttons (e.g., A, B, C, D), and fast or slow motion viewing buttons (not shown in FIG. 3).

In some embodiments, system 10 may be configured to present video to enable second surgeon 20 to watch the surgery as it is performed by first surgeon 18. System 10 may also be configured to enable second surgeon 20 to pause the video feed of the surgery during the surgery (e.g., using pause button 38). Second surgeon 20 may then have the option to rewind (e.g., using rewind button 34) the video feed and play an earlier part of the surgery either unprocessed or modified (e.g., in slow motion, false color, etc.). After rewatching the earlier part, second surgeon 20 may decide to continue watching from that part or the second surgeon 20 may elect to fast-forward (e.g., using fast-forward button 36) to another part. For example, second surgeon 20 may elect to catch up to the live video feed by fast-forwarding until reaching real time.

Figure 4:
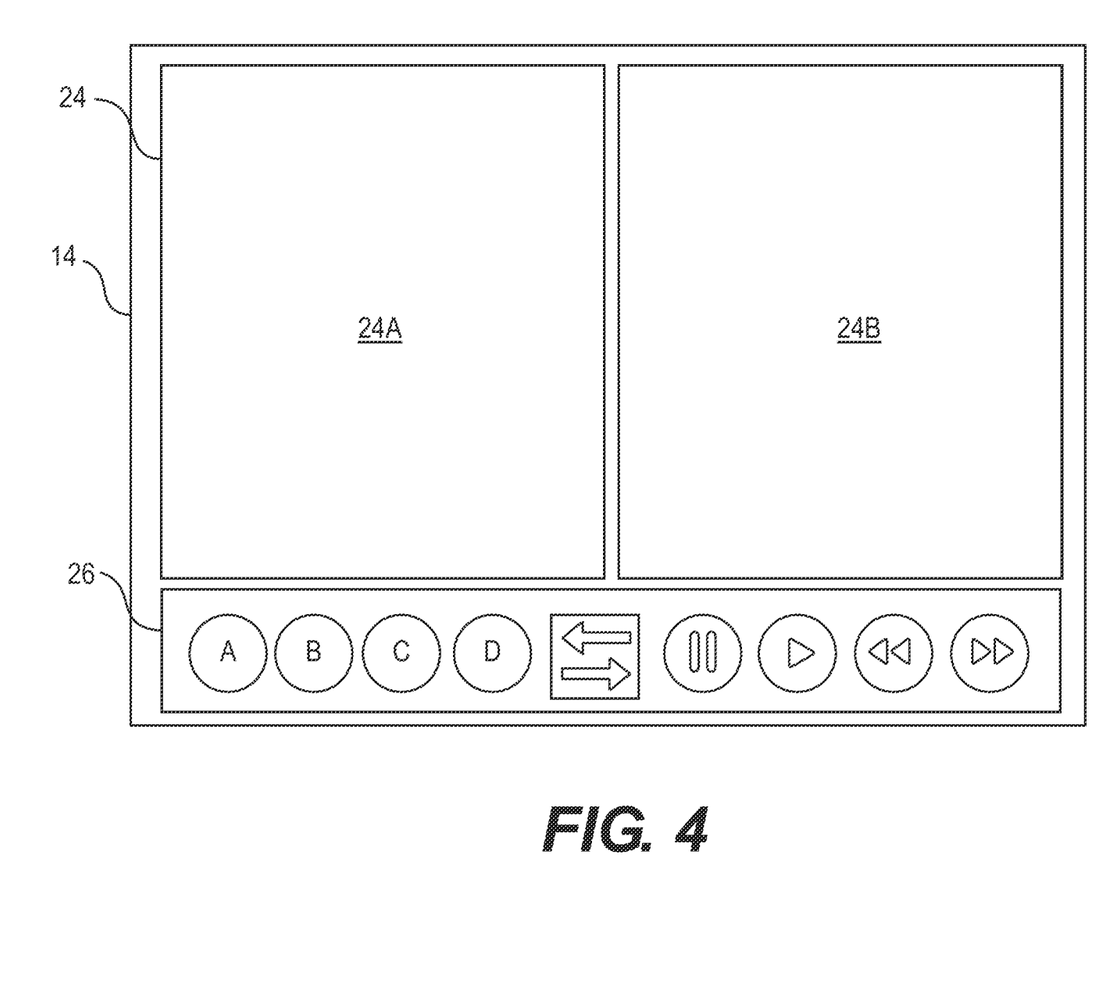
FIG. 4 is another illustration of the training display console, according to an exemplary embodiment.

In some embodiments, as shown by the example in FIG. 4, screen 24 of training display console 14 may be configured to switch display modes to a split screen so that it displays a first screen 24A and a second screen 24B side-by-side. For example, second surgeon 20 may switch to split-screen mode (e.g., using the selection buttons) and may rewind and play a part of the surgery again on first screen 24A while second screen 24B continues displaying the video feed of the surgery in real time. Although FIG. 4 illustrates a split screen with two screens side by side, it is contemplated that the number of screens may be greater than two and the layout of the screen may also vary.

Training display console 14 may be configured to enable second surgeon 20 to switch to a simulation mode (e.g., using mode switching button 38). In simulation mode, the video feed of the surgery may be paused and screen 24 may switch from displaying the video feed of the surgery to a virtual reality simulation of the surgical field. In some embodiments, screen 24 may be configured to display the simulation in 3D video. In simulation mode, second surgeon 20 may be able to simulate one or more surgical steps (e.g., the current step, the next step, or a sequence of steps) of the surgery being performed by first surgeon 18. In some embodiments, training display console 14 when switched to the simulation mode may change to a split screen layout, as shown in FIG. 4, and first screen 24A or second screen 24B may display the simulation while the other screen may continue displaying the video feed of the surgery being performed by first surgeon 18.

In some embodiments, system 10 may be configured to generate the simulation. For example, system 10 may interface with one or more cameras (not shown) that record the surgery and the surgical field. In some embodiments, system 10 may be configured to generate a simulation that recreates a virtual reality animation of the surgical field. In some embodiments, system 10 rather than generating the simulation may have an index of pre-generated surgical simulations and system 10 may utilize the pre-generated simulations. For example, in some embodiments, second surgeon 20 may select the surgery and the step of the surgery for which he/she wants to simulate using training interface 26. In some embodiments, system 10 may be configured to identify (e.g., using video analysis) which step first surgeon 18 is currently performing and system 10 may be configured to default to that same step when second surgeon 20 switches to the simulation mode.

The manner in which second surgeon 20 may carry out the simulation may vary. For example, in some embodiments, training display console 14 may display a list of options (e.g., multiple choice) on screen 24 and second surgeon 20 may select one of the options (e.g., using training interface 26) and based on the option selected, the simulation may advance and give another list of options, and so on. The list of options may include, for example, the medical instrument the surgeon is to use, the location for an incision, the type of incision to be made, or other selections a surgeon may make during a surgery. In some embodiments, the simulation may also be configured to evaluate the intent of second surgeon 20 with regard to different options. For example, training display console 14 may display different intent options and second surgeon 20 may select. In some embodiments, screen 24 may be a touch screen and second surgeon 20 performs the simulation by touching the screen in different ways (e.g., tapping, dragging, pinching, expanding, etc.).

Figure 5:
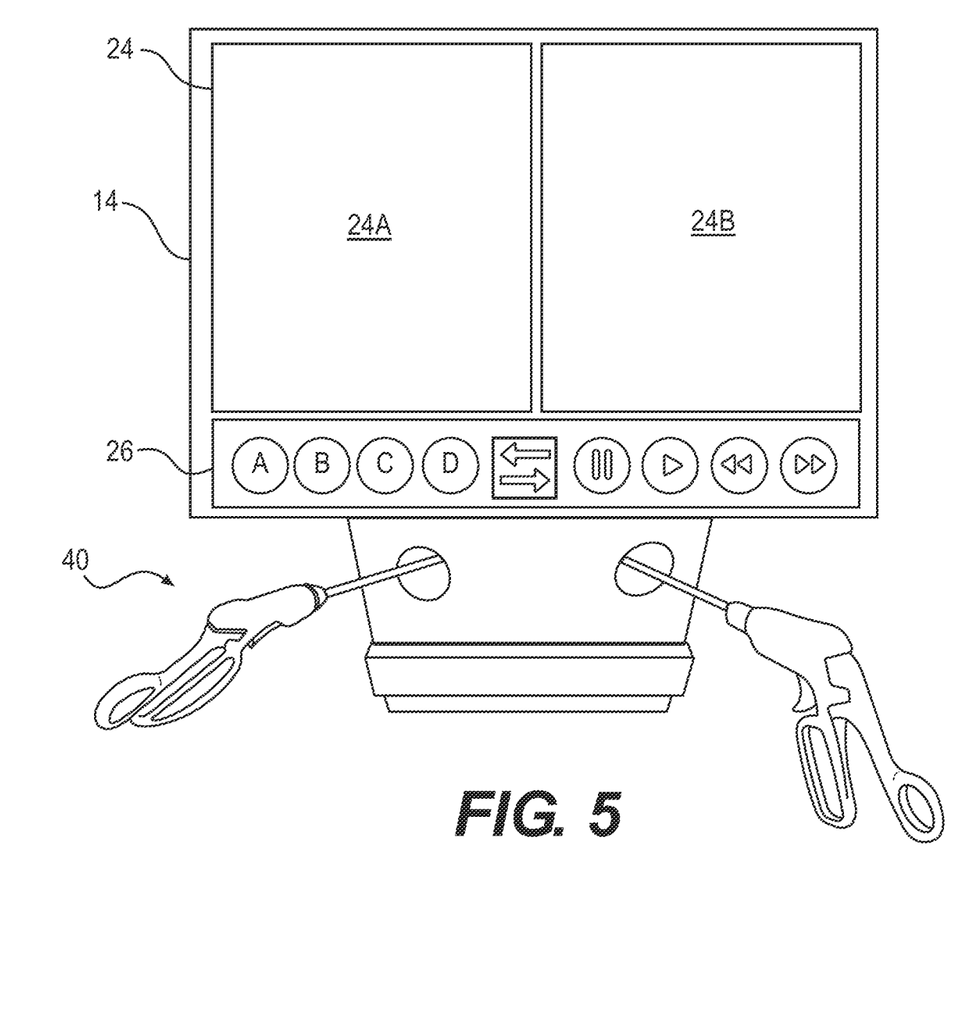
FIG. 5 is another illustration of a training display console, according to an exemplary embodiment.

In some embodiments, as shown in FIG. 5, training display console 14 and training interface 26 may include one or more simulation instruments 40 that second surgeon 20 may grasp and manipulate, which may control the positioning and movement of corresponding instruments displayed as part of the simulation on screen 24. In some embodiments, where system 10 interfaces with surgical robotic device 22 used by first surgeon 18 to perform the surgery, simulation instruments 40 may be configured to be duplicates of surgical robotic device controls. For such embodiments, second surgeon 20 may utilize the duplicates of the surgical robotic device controls to perform the simulation.

In simulation mode second surgeon 20 may elect the scope of each simulation. For example, second surgeon 20 may elect to simulate individual steps of the surgery incrementally or second surgeon 20 may elect to simulate multiple steps sequentially. Second surgeon 20 may elect the scope of the simulation, for example, based on the complexity of the steps.

System 10 may be configured such that second surgeon 20 may compare his/her simulated surgical steps to those of the actual surgical step(s) performed by first surgeon 18. For example, system 10 may be configured to superimpose and display on training display console 14 the surgical step(s) simulated by second surgeon 20 over the corresponding surgical step(s) performed by first surgeon 18 during the surgery. In some embodiments, training display console 14 may show side by side (e.g., split screen) the surgical step(s) simulated by second surgeon 20 next to the corresponding surgical step(s) performed by first surgeon 18 during the surgery.

In some embodiments, system 10 may be configured to generate a performance score based on the surgical steps simulated by second surgeon 20. For example, the performance score may be generated by comparing the surgical step(s) simulated by second surgeon 20 to the corresponding surgical step(s) performed by first surgeon 18 during the surgery. In some embodiments, the performance score may be generated by comparing the surgical steps(s) simulated by second surgeon 20 to a previous exemplary surgery. In some embodiments, the performance score may be generated and displayed on screen 24 after each simulated step or may be generated and displayed at the conclusion of the surgery.

System 10 may be configured to enable second surgeon 20 to switch in and out of the simulation mode. Second surgeon may use training interface 26 (e.g., mode switching button 38) to toggle back and forth between simulation mode and display mode. As described herein, in some embodiments training display console 14 may be configured to pause the video feed of the surgery while in the simulation mode. Thus, when second surgeon 20 switches back to display mode, the video feed of the surgery may be paused and second surgeon 20 may elect to unpause if desired. When unpaused, the video feed of the surgery may continue playing from where it was paused. Training display console 14 may also enable second surgeon 20 to watch the video feed of the surgery at an accelerated speed (e.g., by using fast-forward button 36). Second surgeon 20 may elect to fast-forward until the video feed of the surgery catches up to real time (i.e., live).

In some embodiments, operating display console 12 may include an operating interface like training display console 26 as described herein. Operating display console 12 may also be configured to enable first surgeon 18 to pause the video feed of the surgery during the surgery and to switch operating display console 12 from a surgical mode to a simulation mode. Similar to training display console 14, in the simulation mode first surgeon 18 may practice one or more surgical steps. For example, first surgeon 18 may practice the next step or next sequence of steps of the surgery before actually performing those steps. In some embodiments, first surgeon 18 may simulate various maneuvers depending on the surgical scenario in order to evaluate and compare the outcomes. Based on the outcomes first surgeon 18 may then select one maneuver (e.g., with best outcome) to actually perform on the patient. Operating training console 12 may switch to a split screen layout (e.g., as shown in FIG. 4), when in the simulation mode so that first surgeon 18 may continue monitoring the surgical field of the patient to ensure no complications or other issues arise while first surgeon 18 is simulating the surgical steps.

In some embodiments, system 10 may be used by just a single surgeon, (e.g., first surgeon 18). First surgeon 18 may use operating display console 12 while actually operating, but may take a moment during the surgery to move over to training display console 14 to simulate one or more steps of the surgical procedure. This may enable first surgeon 18 to rehearse, for example, one or more tricky steps of a surgery before having to perform the steps on a patient.

Figure 6:
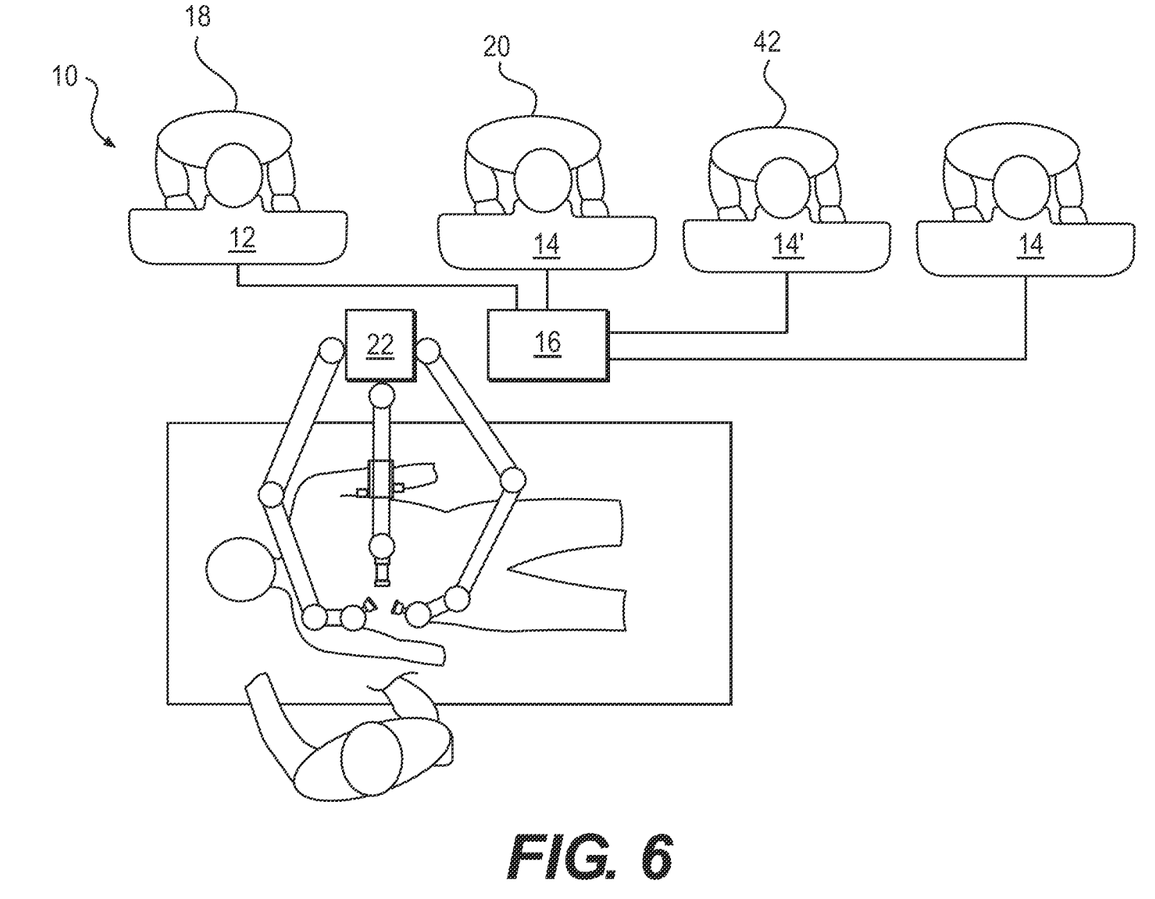
FIG. 6 is a schematic illustration of a surgical training system, according to an exemplary embodiment.

In some embodiments, as shown in FIG. 6, system 10 may include a plurality of training display consoles 14 that a plurality of surgeons may utilize to view and simulate the surgery while it is being performed. In some embodiments, operating display console 12 and training display consoles 14 may be setup in the operating room where the surgery is being performed. For example, both first surgeon 18 and second surgeon 20 may be in the operating room. In some embodiments, training display console 14 and second surgeon 20 may be in a room separate from the operating room. For example, training display console 14 and second surgeon 20 may be in an observation or training room. In some embodiments, training display console 14 and second surgeon 20 may be remote from the operating room, for example, in another building or even in another city, state, or country. System 10 may be configured such that controller 16 and training display console 14 communication via a remote connection (e.g., a secure internet connection, LAN, broadband, or satellite). The remote versatility of system 10 may enable, for example, a surgical resident located in a hospital in one geographical location to receive training by an experienced surgeon that operates in another geographical location.

As shown in FIG. 6, system 10 may also include a second training display console 14' and in some embodiments second training display console 14' may be configured for training a surgical assistant 42. For example, second training display console 14' may include a screen and a training interface similar to the training display console 14, shown in FIG. 3. Second training display console 14' may be configured to display cues of what surgical assistant 42 should be doing. In addition, surgical assistant 42 may use second training display console 14 to pause the video feed of the surgery and to switch from a display mode to a simulation mode. In the simulation mode, surgical assistant 42 may simulate one or more surgical task of the surgical assistant.

In some embodiments, controller 16 may be characterized as a computer. Controller 16 may include one or more processors, including for example, a central processing unit (CPU and/or a GPU). The processors may include any suitable type of commercially available processor or may be a custom design. Controller 16 may include additional components, for example, non-volatile memory (e.g., a flash memory), volatile memory (e.g., a random access memory (RAM)), and other memory components. Controller 16 may be configured to store and run software that executes the operation of system 10, as described herein. Controller 16 may have a plurality of interfaces designed to communicate with peripheral devices (e.g., a surgical display console 12, a training display console 14, and a surgical robotic device 22).

In some embodiments, system 10 may include just controller 16 and controller 16 may be configured to interface with one or more display consoles (e.g., a first display console and a second display console), which may be standard off the shelf monitors or displays. For example, the display consoles may be an LCD, LED, or the like monitor. In some embodiments, controller 16 may interface with a first display console and control operation of the first display console such that it functions like operating display console 12. Controller 16 may also interface with the second display console and control operation of the second display console such that it functions like training display console 14. In some embodiments, controller 16 may be configured to display the operating interface or the training interface on the corresponding display console. For example, in some embodiments first display console and second display console may be touch screens and the operating interface and the training interface may be graphical user interfaces (GUIs) displayed on the screens of the consoles. In some embodiments, controller 16 may also be configured to interface with a keyboard, mouse, or joystick, which may be used as the operating interface and/or the training interface.

In some embodiments, controller 16 may be configured to interface with a surgical robotic device that includes a first display console and controller 16 may be configured to control the first display console of the surgical robotic device so it operates similar to operating display console 12, as described herein.

In some embodiments, controller 16 may be integrated into operating display console 12, training display console 14, or a surgical robotic device. In some embodiments, system 10 may include training display console 14 and controller 16, which may be integrated into training display console 14 and be configured to interface with another display console (e.g., off the shelf monitor or display) and control operation of the display console so it functions like operating display console 12. In some embodiments, system 10 may include operating display console 14 and controller 16, which may be integrated into operating display console 12 and configured to interface with another display console and control operation of the display console so it functions like training display console 14. In some embodiments, system may include training display console 14 and controller 16 and configured to interface with a surgical robotic device having a display console and controller 16 may be configured to control operation of the display console so it functions like operating display console 12.

System 10 as described herein may be utilized for a variety of methods of surgical training. Various methods of surgical training utilizing system 10 will now be described with reference to FIG. 7.

Figure 7:
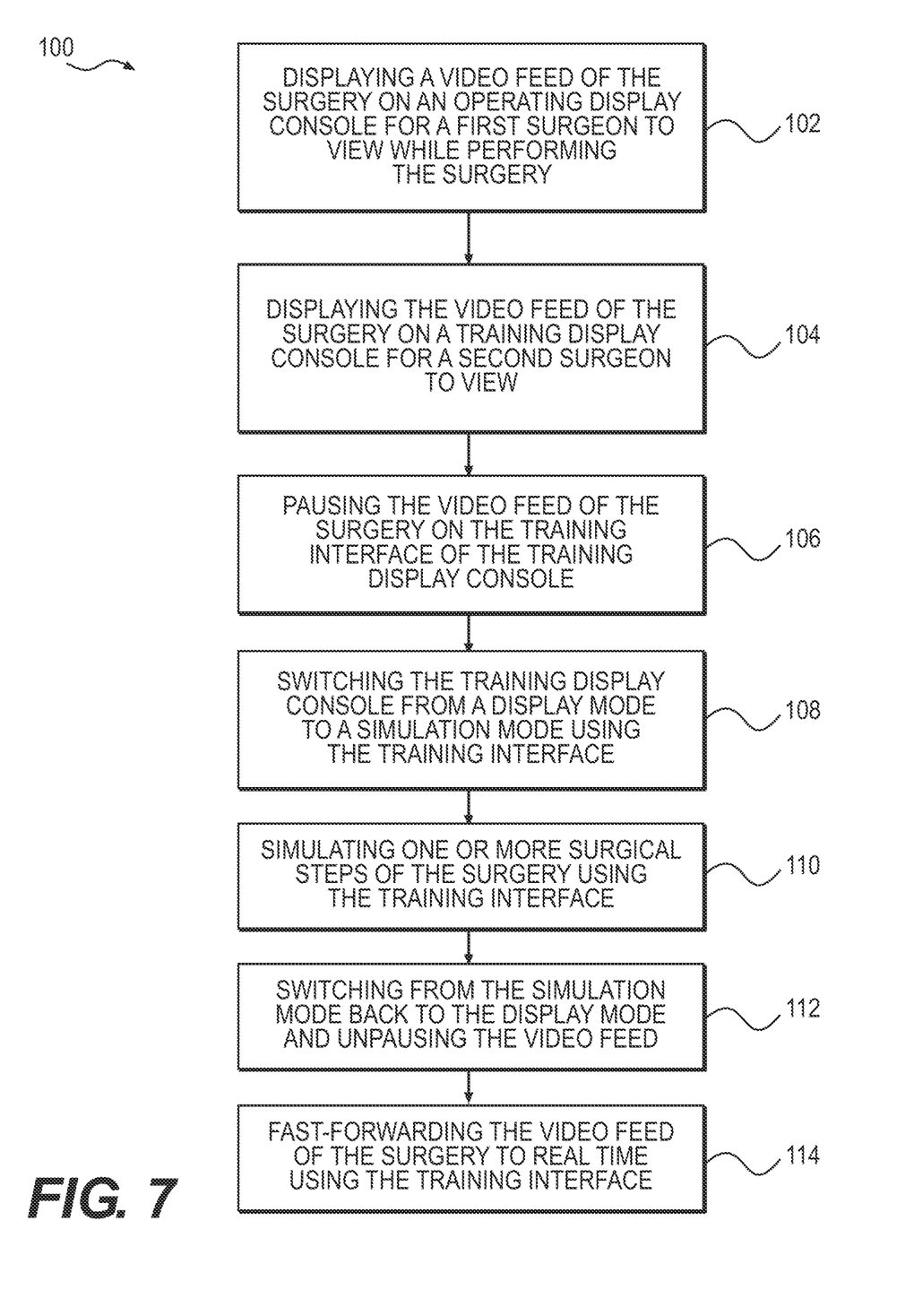
FIG. 7 is a flow chart illustrating a method of surgical training, according to an exemplary embodiment.

According to an exemplary embodiment, system 10 may be utilized for a method 100 of surgical training, wherein the training is conducted during a surgery. As described herein, system 10 may be used during surgeries that utilize or do not utilize a robotic surgical device. Method 100, at step 102 may include displaying a video feed of the surgery on an operating display console for a first surgeon to view while performing the surgery. Simultaneously, during the surgery, method 100 at step 104 may include displaying the video feed of the surgery on a training display console for a second surgeon to view.

Method 100, at step 106 may include pausing the video feed of the surgery using a training interface of the training display console. Method 100 may also include, at step 108, switching the training display console from a display mode to a simulation mode using the training interface. Once in simulation mode at step 110, method 100 may also include simulating a surgical step of the surgery using the training interface. Method 100 may also include at step 112, switching from the simulation mode back to the display mode and unpausing the video feed of the surgery. Method 100 may also include at step 114, fast-forwarding the video feed of the surgery to real time using the training interface. Method 100 may also include additional steps that utilize the functionality of system 10, as described herein System 10 and method 100 as described herein provide a surgical simulation training platform that is configured to allow an experienced surgeon, a surgeon in training, and/or a surgical assistant to learn and receive training during a surgery. System 10 may be integrated with current surgical training for residents and may also provide more training opportunities for experienced surgeons. For example, a surgical resident spends much of his/her time in the operating room and as a result, there is little if any additional time available to spend in front of a simulator. System 10 addresses this challenge by enabling surgical residents to get simulator training while in the operating room observing surgeries performed by experienced surgeons. Similarly, an experienced surgeon does not have much time available to spend training on a surgical simulator. System 10 addresses this challenge by enabling an experienced surgeon to integrate simulator training with actual surgery. System 10 also improves current surgical training by increasing interaction. Typically, surgical residents spend much of their time in the operating room watching screens without engaging or interacting. System 10 addresses this limitation by providing a training system for surgical residents to actually interact as the surgeries takes place.

The invention claimed is:

1. A surgical system, comprising:
a display console for a surgeon to view a video feed of a surgery while the surgery is performed, the display console including:
one or more physical simulation instruments to replicate surgical robotic device controls for the surgeon to simulate the surgery during a simulation mode of the surgical system; and
an interface for activating the simulation mode to simulate one or more surgical steps of the surgery, and wherein the interface includes an input for superimposing the one or more surgical steps simulated by the surgeon over the video feed showing one or more corresponding surgical steps performed during the surgery.

2. The surgical system of claim 1, further comprising the surgical robotic device controls capable of being manipulated by the surgeon to perform at least a portion of the surgery with a surgical robotic device.

3. The surgical system of claim 1, wherein the interface includes a mode switching input for switching the display console between the simulation mode and a display mode showing the video feed of the surgery, and wherein the interface further includes a fast-forward button for fast-forwarding the video feed until the video feed catches up to real time.

4. The surgical system of claim 1, further comprising a plurality of training display consoles for a plurality of surgeons to view the video feed of the surgery while the surgery is performed.

5. The surgical system of claim 1, further comprising a training display console for a second surgeon to practice the one or more surgical steps of the surgery.

6. The surgical system of claim 5, wherein the display console and the training display console are located in an operating room during the surgery.

7. The surgical system of claim 5, further comprising a controller that interfaces the display console and the training display console, wherein at least one of the display console or the training display console are remote from an operating room during the surgery, and wherein at least one of the display console or the training display console interface with the controller via a secure internet connection.

8. The surgical system of claim 1, wherein the surgical system is configured to generate a performance score based on the one or more surgical steps simulated by the surgeon compared to a corresponding surgical step shown in the video feed during the surgery.

9. The surgical system of claim 1, further comprising an assistant display console for a surgical assistant to view the video feed, wherein the assistant display console includes a training interface for displaying cues of what the surgical assistant should be doing, for pausing the video feed, and for switching the assistant display console to a simulation mode for simulating one or more surgical tasks for the surgical assistant.

10. The surgical system of claim 1, further comprising surgical robotic device controls capable of being manipulated by the surgeon to perform at least a portion of the surgery with a surgical robotic device, and wherein the one or more physical simulation instruments are duplicates of the surgical robotic device controls.

11. The surgical system of claim 1, wherein the one or more physical simulation instruments are graspable and manipulatable instruments.

12. A method of surgical training, comprising:
during a surgery, displaying a video feed of the surgery on a display console for a surgeon to view while performing the surgery;
pausing the video feed of the surgery on the display console using an interface;
switching the display console from a display mode to a simulation mode using the interface;
simulating one or more surgical steps of the surgery while in the simulation mode using the interface; and
superimposing the one or more surgical steps simulated by the surgeon over the video feed showing one or more corresponding surgical steps performed during the surgery.

13. The method of claim 12, further comprising:
switching from the simulation mode back to the display mode and unpausing the video feed of the surgery; and
fast-forwarding the video feed using the interface until the video feed catches up to real time.

14. The method of claim 12, further comprising during the surgery displaying the video feed of the surgery on a plurality of training display consoles for a plurality of surgeons to view and use to simulate steps of the surgery during the surgery.

15. The method of claim 12, further comprising a training display console for a second surgeon to practice one or more surgical steps of the surgery.

16. The method of claim 15, wherein the display console and the training display console are located in an operating room during the surgery.

17. The method of claim 15, wherein at least one of the display console or the training display console are remote from an operating room during the surgery, and wherein the method further comprises transmitting the video feed of the surgery to at least one of the display console or the training display console via a secure internet connection.

18. The method of claim 12, further comprising generating a performance score based on a comparison of the one or more surgical steps simulated by the surgeon to a corresponding surgical step performed during the surgery.

19. The method of claim 12, further comprising:
during the surgery displaying the video feed of the surgery on a training display console for a surgical assistant to view the surgery;
displaying cues of what the surgical assistant should be doing on the training display console;
pausing the video feed of the surgery and switching the second training display console from a display mode to a simulation mode using a training interface, and simulating one or more surgical tasks for the surgical assistant.

20. The method of claim 12, wherein the surgeon performs the surgery using a robotic surgical device that interfaces with the display console.

* * * * *